Dec. 1, 1942.  J. A. NUMERO ET AL  2,303,857
AIR-CONDITIONER FOR VEHICLES
Filed Nov. 16, 1939  8 Sheets-Sheet 6
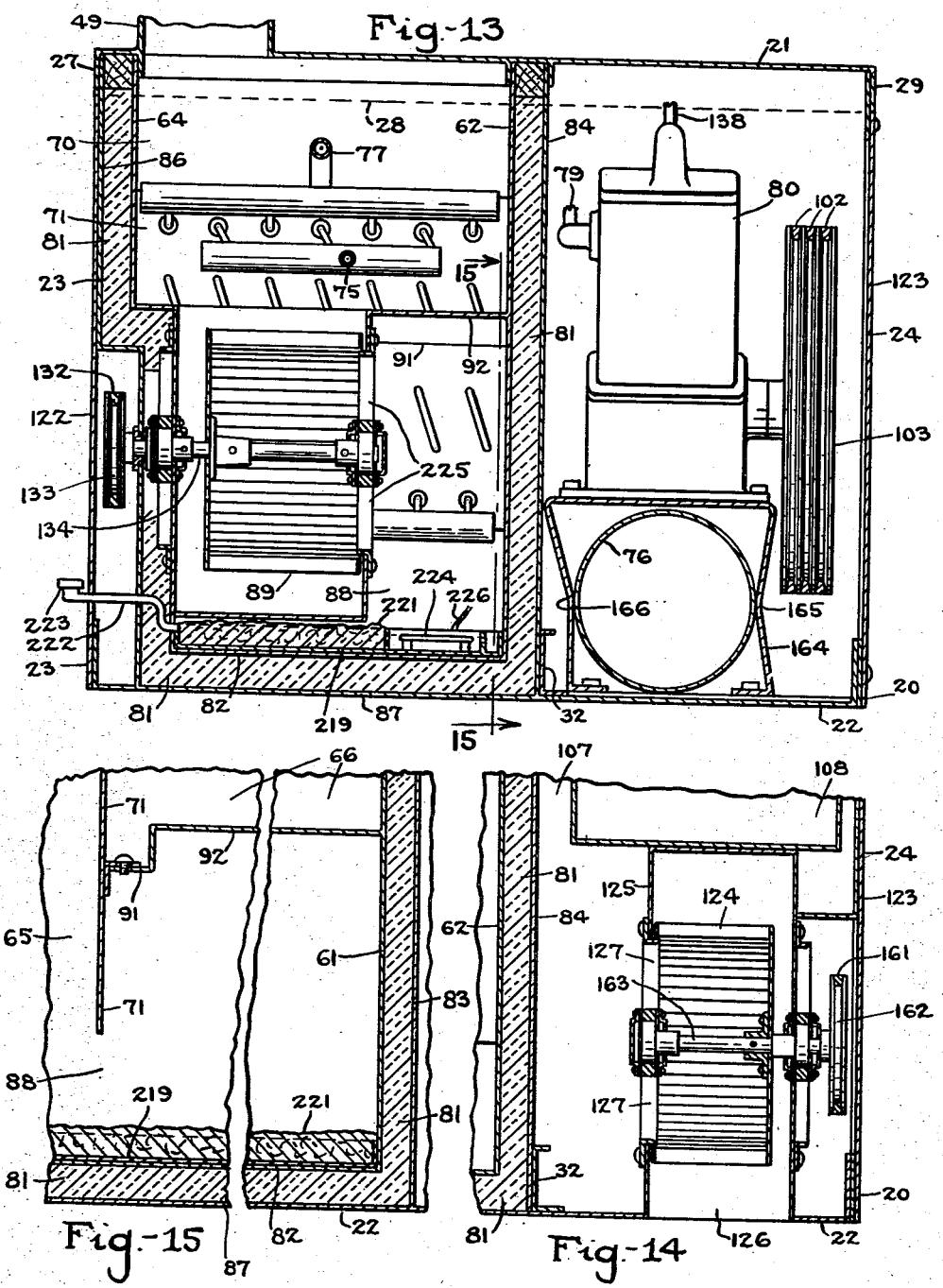
Inventors
Joseph A. Numero.
Frederick M. Jones.
By F. A. Whiteley
Attorney.

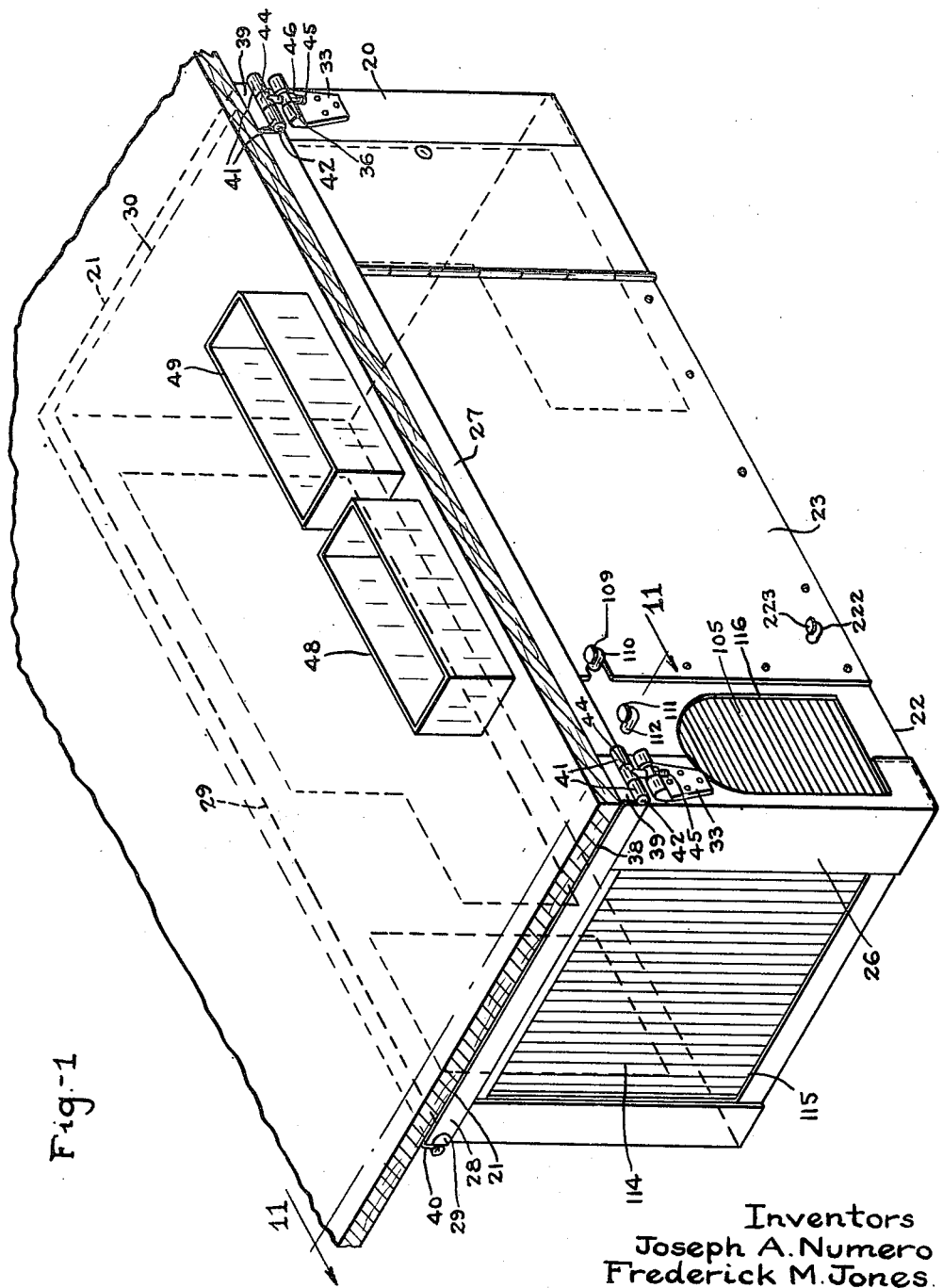

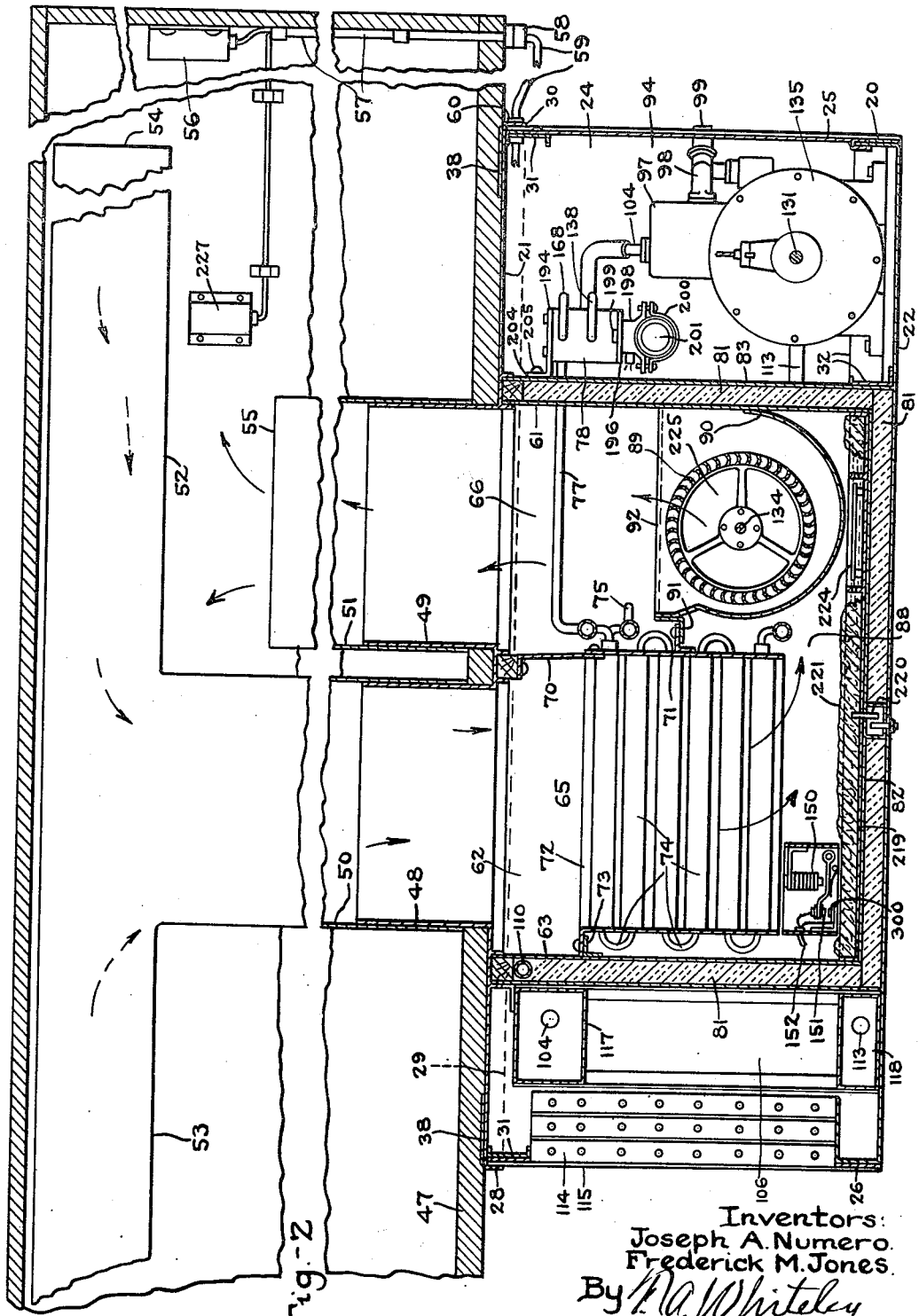

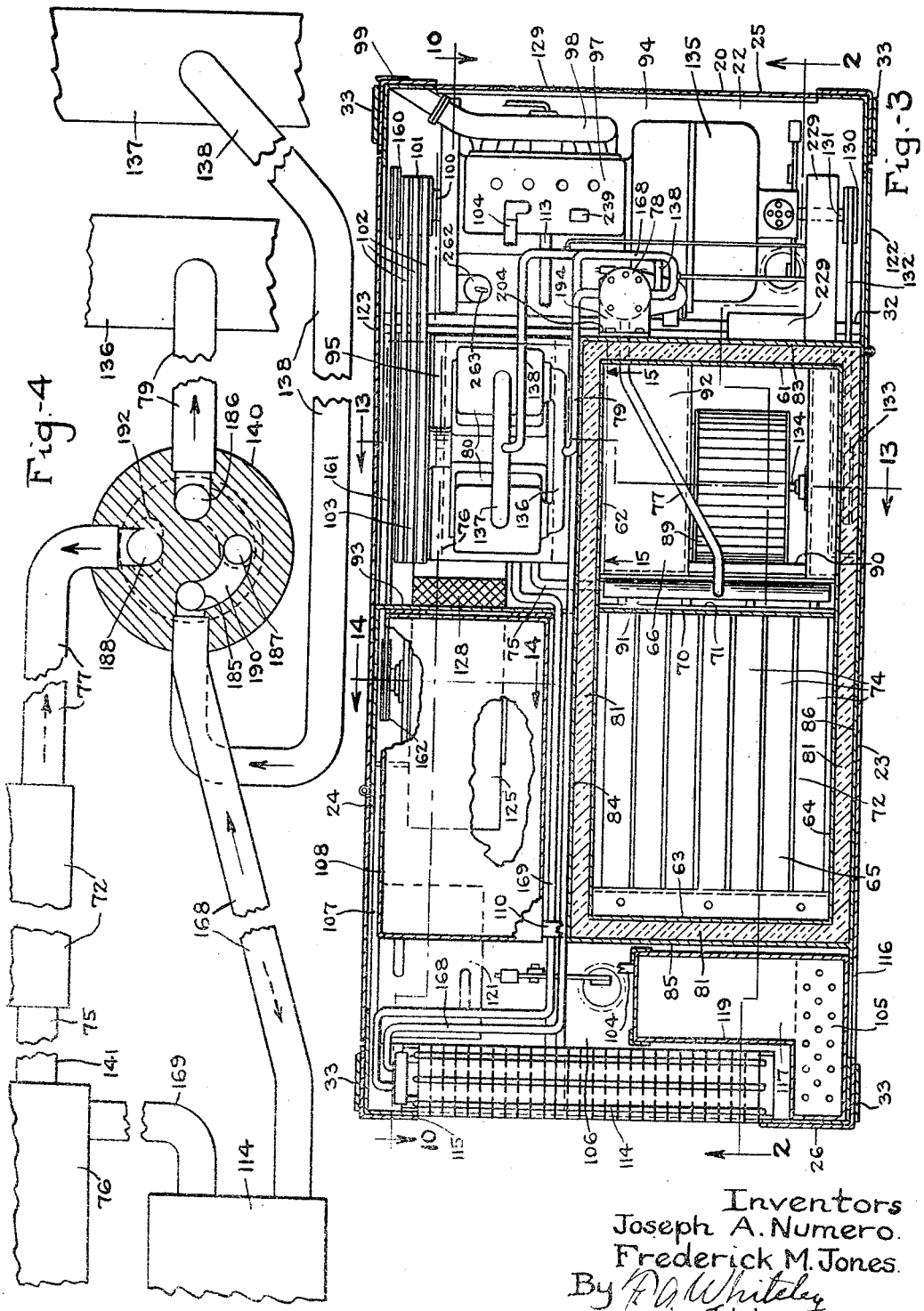

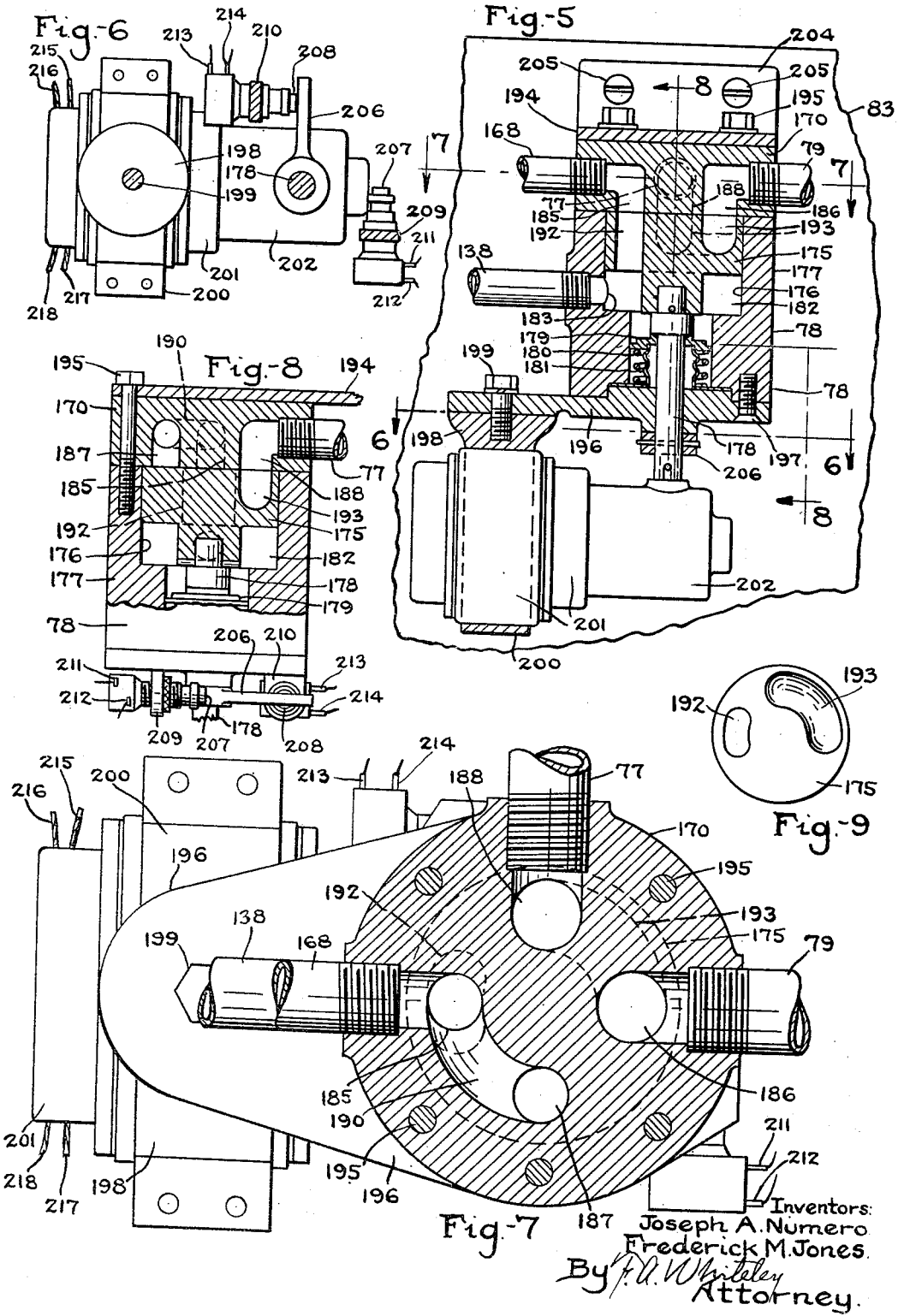

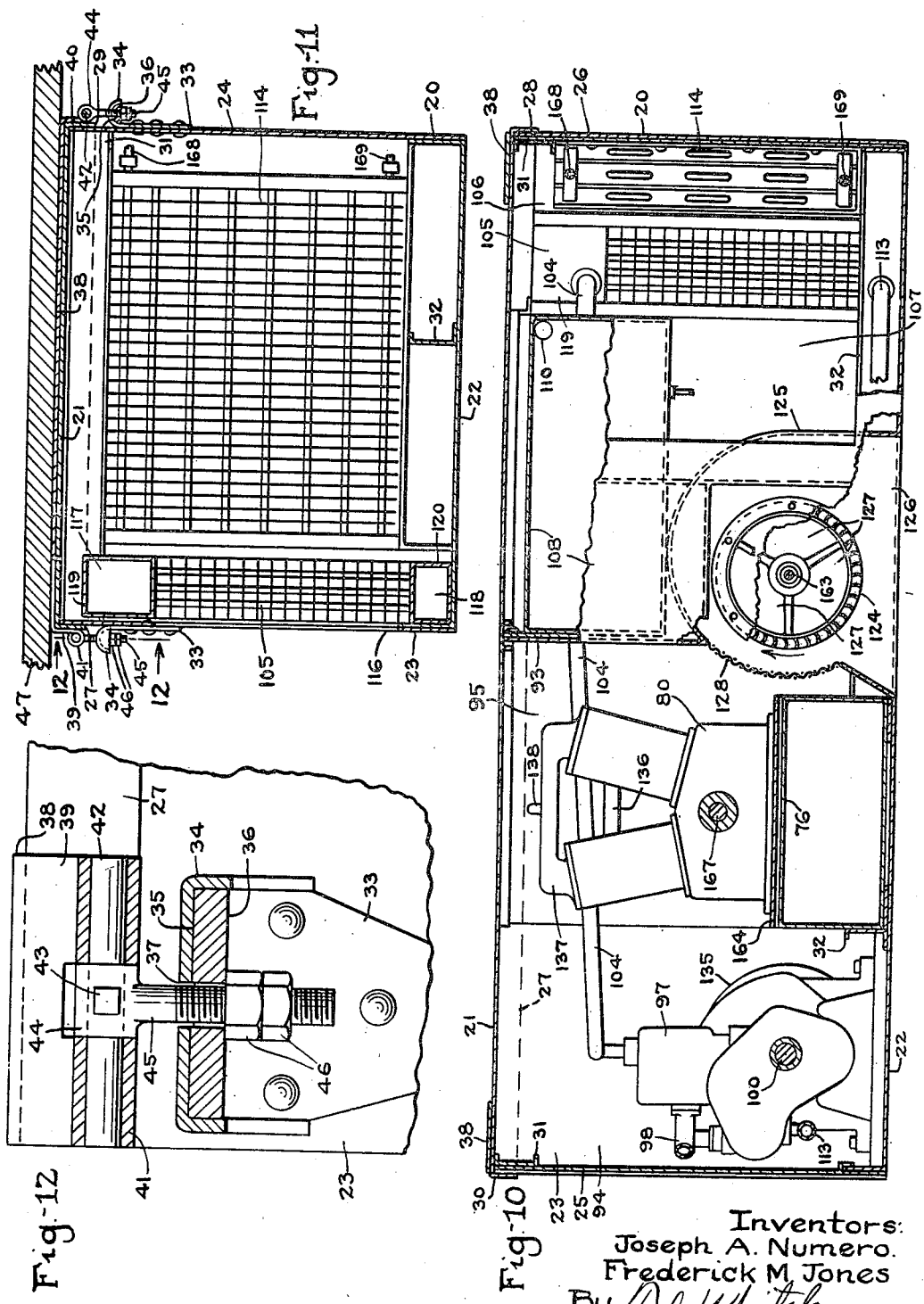

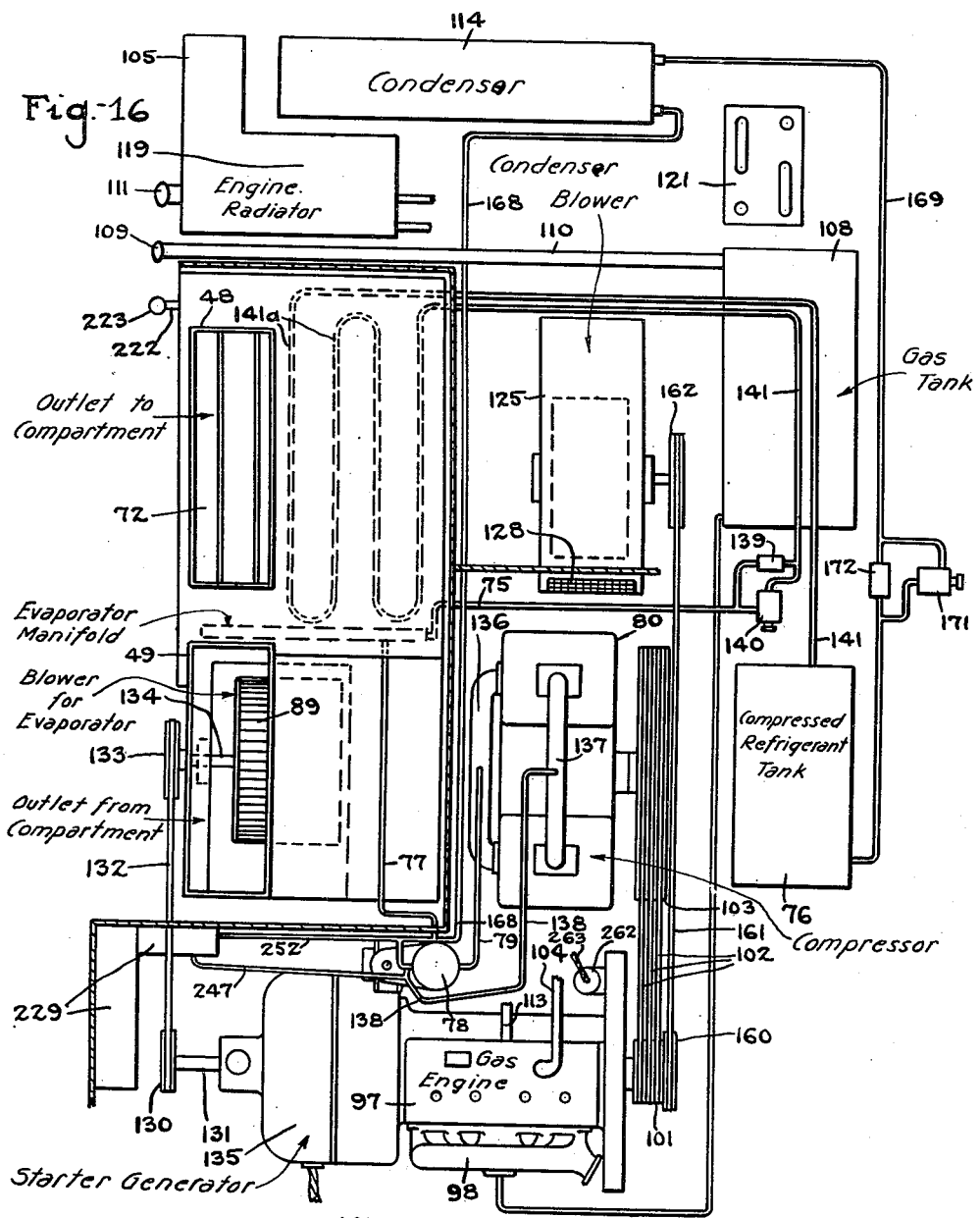

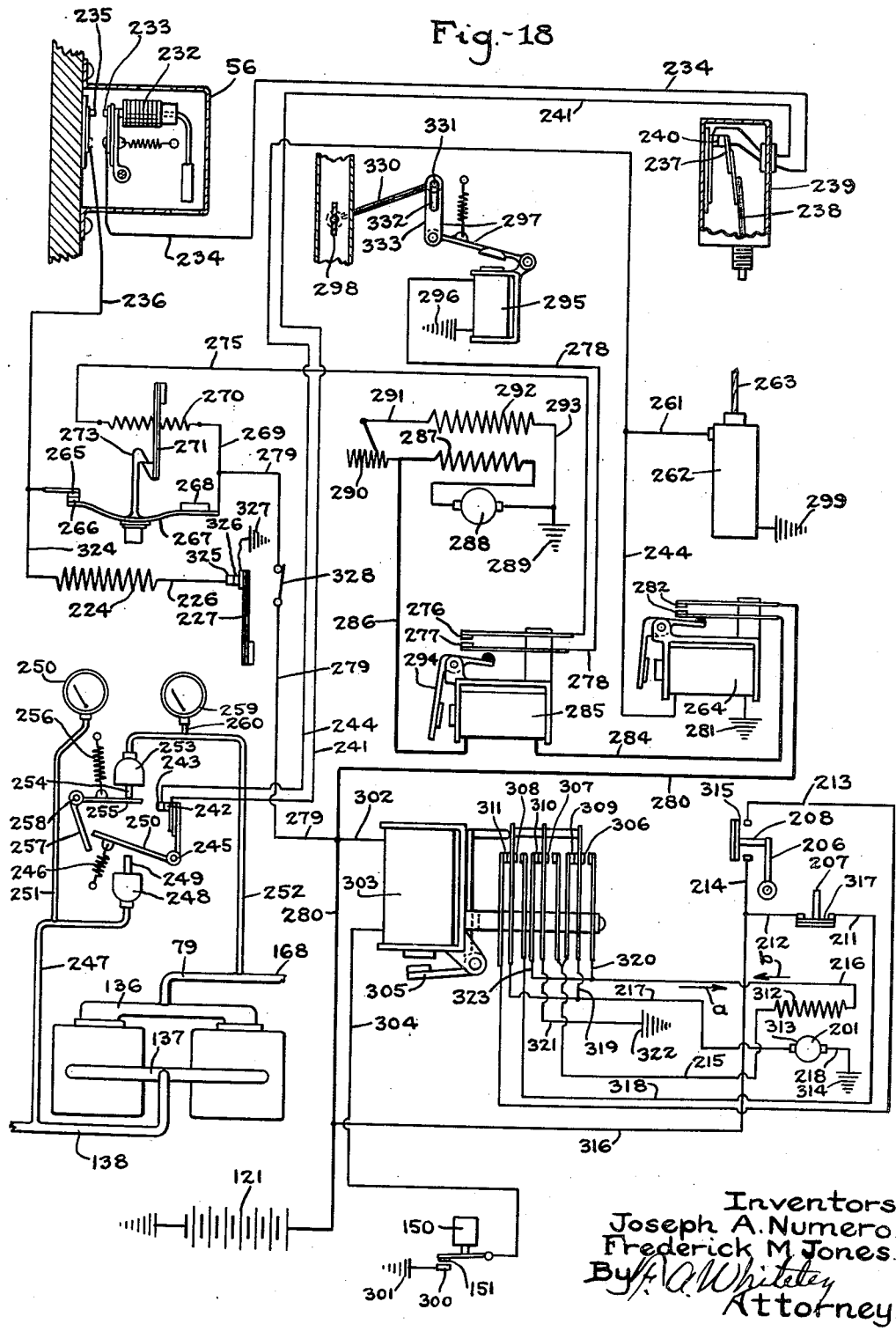

Patented Dec. 1, 1942

2,303,857

UNITED STATES PATENT OFFICE 2,303,857

AIR CONDITIONER FOR VEHICLES

Joseph A. Numero and Frederick M. Jones, Minneapolis, Minn., assignors to U S Thermo Control Company, an association composed of Joseph A. Numero and M. Green Application November 16, 1939, Serial No. 304,796

10 Claims. (Cl. 62—117)

Our invention relates to air conditioners for compartments of vehicle carriers and has for its primary object to provide in conjunction with a vehicle carrier, such as a truck, railroad car or the like, a means of conditioning the air within the compartment of said carrier by tempering, humidifying and circulating the air therein, which means shall be conveniently attachable to and removable from such carrier and which shall automatically effect the desired air conditioning within the compartment of the carrier.

In the transporting of goods, particularly perishable goods such as vegetables, fruits, eggs, dressed poultry and the like, what is known as trucks have come very largely into use because of their mobility, accessibility for loading, and capacity for rapid transportation and smooth carriage of their contents. However, even though trucks move largely at night, conditions of weather, particularly hot weather, have presented serious difficulties. Suitable means for cooling or otherwise tempering or conditioning the air in the compartments of trucks have not been available. It is therefore, a particular object of our invention to provide in conjunction with the compartment of a truck or van means for circulating air within and through all parts of said compartment and means operative upon the current of air as it is circulated properly to temper and otherwise condition it.

It is a further important object of our invention to assemble the air circulating and air conditioning means in a unit so constructed that the same may be readily attached to the outside of the floor of the truck, or railroad car, and so attached that it may conveniently be removed and replaced as conditions may require, thus being at all times readily available for repair, cleaning and replenishment, and at the same time not occupying space in the compartment of the truck or car, which is necessarily valuable for receiving the goods to be transported.

It is a further object of our invention to provide within the compartment of the truck or car and adjacent a wall thereof, a set of passageways to cooperate with unit passageways of the aforesaid assembled unit such that when the unit is applied to the lower side of the floor of the truck, the air may be delivered to the unit from the upper parts of the truck and be forced into the truck after the circulating air has been conditioned.

It is a further object of our invention to assemble in the unit aforesaid, in a distinctive arrangement to render the same effective for the purpose, a motor, a compressor driven thereby, a main evaporator heat exchanger, a blower for moving the air from within the compartment of the truck or car to and past the heat exchanger and back to the compartment of the truck or car, a condenser and tank for the fluid to be compressed and evaporated, humidifying means, a second blower for cooling the motor and the heated liquid going through the condenser, and various instrumentalities associated with these elements for effecting automatic control thereof.

It is a further object of our invention to provide a housing for the above stated instrumentalities formed of an outside casing and a chamber therein with an arrangement of inner chambers and passageways not only for mounting and holding the various instrumentalities above referred to in a highly compact and conveniently accessible form, but also for providing for such movements of air therethrough as may be desired.

It is a further object of our invention to provide in conjunction with a gas engine, a starter unit controlled by a thermostat within the compartment of the truck or car for turning off and starting the motor when the heat or cooling demands within the compartment through said thermostat call for it.

It is a further object of our invention to provide automatically operative valve mechanism for causing reversal of direction of fluid from the compressor for defrosting the heat exchanger surfaces formed in conjunction with the evaporator. It will be obvious that the objects enumerated in this and the last paragraph are effected by controlling the direction of flow of the fluid from the compressor. When it goes to the condenser first and then through the evaporator, the air passing through the evaporator coils will be cooled. But when it goes first through the evaporator and then through the condenser the air passing through the evaporator will be heated, so that the ultimate result will be to cool the compartment or heat the compartment according to the direction of flow of compressor fluid.

It is a further object of our invention to provide means for receiving and retaining the water resulting from defrosting and to provide means for maintaining a supply of water of a desired depth subject to current of air going to and from the truck compartment to aid in suitably humidifying said air.

It is a further object of our invention to provide in conjunction with said body of water means to cause the partially heated refrigerant liquid to pass through coils within said body of water to prevent freezing thereof and increase its capacity for evaporation.

It is a further object of our invention to provide an electric heater in association with said body of water and controlled by a humidostat in the truck compartment to increase the amount of water vapor in the air of the truck compartment.

Other objects and the full advantages of our invention will appear in connection with the detailed description thereof and the novel features by which the advantageous results following the practice of our invention are secured, will be particularly pointed out in the claims.

In the drawings illustrating an application of our invention in one of its forms:

Fig. 1 is a perspective view of the unit as the same would appear when attached to the lower surface of the floor of a transport carrier such as a truck or van, the floor being shown broken away.

Fig. 2 is a sectional elevational view taken on line 2—2 of Fig. 3 when the unit is attached to the underside of the floor of the truck and also taken through parts of the truck shown broken away to show the air circulating ducts within the truck compartment.

Fig. 3 is a sectional plan view of the unit with some parts broken away.

Fig. 4 is a detail plan view on an enlarged scale of the reversing valve for the compressor, some parts shown in section and broken away.

Fig. 5 is a central sectional elevational view through the valve casing and reversing valve showing the motor for operating it.

Fig. 6 is a sectional view taken on line 6—6 of Fig. 5 viewed in the direction of the arrows.

Fig. 7 is a sectional view on an enlarged scale (full size) taken on line 7—7 of Fig. 5 viewed in the direction of the arrows.

Fig. 8 is a vertical sectional view taken on line 8—8 of Fig. 5 viewed in the direction of the arrows.

Fig. 9 is a top plan view of the rotatable valve member only.

Fig. 10 is a sectional plan view taken on line 10—10 of Fig. 3 viewed in the direction of the arrows.

Fig. 11 is a transverse elevational view taken on line 11—11 of Fig. 1.

Fig. 12 is an enlarged sectional view taken on line 12—12 of Fig. 11 for showing the means for securing the unit removably to the underside of the truck floor.

Fig. 13 is a transverse sectional view on line 13—13 of Fig. 3 viewed in the direction of the arrows on a somewhat enlarged scale.

Fig. 14 is an enlarged sectional fragmentary view taken on line 14—14 of Fig. 3.

Fig. 15 is a fragmentary sectional view of a part of the blower chamber taken on line 15—15 of Fig. 3 and Fig. 13.

Fig. 16 is a schematic view in plan showing the various instrumentalities and their relations one to the other.

Fig. 17 is an enlarged detail sectional view of the feed valve mechanism.

Fig. 18 is a schematic wiring diagram showing the relation of the different electrically operating instrumentalities.

As shown, a main casing 20 of generally rectangular shape is provided with a bottom wall 22, side walls 23 and 24 and end walls 25 and 26. The box-like structure resulting from the combination of these walls is rigidly reinforced and developed into a very strong cell-like structure by means of partitions later to be described and also by transverse U-pieces 31, 32, and other reinforcing bars and partitions. An inverted pan having a top wall 21 and depending flange portions 27, 28, 29 and 30 (see dotted line Fig. 10) is adapted to be secured to the outside of the floor of the truck or car. Riveted to end walls 23 and 24 are strap plates 33, Figs. 2, 11 and 12. These strap plates are formed with semi-circular extensions 34 providing a recessed seat 35 adapted to receive a semi-circular bar 36 as clearly shown in Fig. 12. The extension 34 may be formed with a slot 37 for a purpose hereinafter to be described.

Upon the ends of plate 21 are secured by welding or otherwise reinforcing plates 38, Figs. 2, 11 and 12, which preferably will be countersunk into the outside bottom of the truck or car with which the apparatus is employed. As shown in Figs. 1 and 11 these bars have their ends turned outwardly at 39 and 40 overlying the flange portions 27 and 29. This arrangement is such that the upper edges of the casing 20 may be inserted in contact with the flanges 27, 28, 29 and 30 and the strap plates 33 in alinement with downturned portions 39 and 40 of the reinforcing plates or bars 38.

Each of the turned down ends 39 and 40 is provided with a cylindrical loop 41 in which is mounted a pin 42 having secured thereto, by means of a thumb screw 43, the hub 44 of a threaded shank or bolt 45. The bolt 45 is adapted to swing through the slot 37 in the semi-cylindrical member 38 and pass through an opening in keeper bar 36. Nuts 46 threaded onto the bolt 45 engage the keeper bar 36 and by this means firmly secure the casing 20 and the parts carried thereby to the bottom wall of the truck or car indicated generally at 47 of Figs. 2 and 11. Suitable rectangular duct extensions 48 and 49, Fig. 2, of a relatively narrow and long cross section as indicated in the schematic diagram of Fig. 16 are secured to plate 21 and are adapted to be projected through openings in the truck floor 47 close to a side wall of the compartment within the truck. These duct extensions are thereby brought within corresponding ducts 50 and 51, Fig. 2, which extend along an inside wall of the truck compartment. Duct 50 which is the duct for withdrawing air from the truck or car, is preferably provided with extensions 52 and 53, close to the top of the compartment, which open as at 54 into the body of the compartment near the ends thereof. The duct 51 carries the air from the air conditioner assembly into the compartment and may advantageously discharge, as indicated at 55 at a point toward the upper part of the compartment.

A thermostat control device 56 is located at a suitable point within the compartment. This has a cable 57 running down a wall of the compartment and through the floor 47 and is provided with a plugging socket 58 which through a cable 59 extending through an insulated block 60 in end wall 26, is adapted to connect the thermostat with controls later to be described. A humidostat 227, later to be described, is similarly connected.

From the above description it will be apparent that the casing 20 and parts carried thereby can readily be attached to and detached from the bottom 47 of any transport vehicle. In practice the plate 21 will first be attached to the bottom of the vehicle with the ducts 48, 49, extending through openings therein as indicated in Fig. 1. The main casing will be placed on blocks which will bring its upper edge below the depending edges of flanges 27, 28, 29 and 30. The casing will then be placed into position under the vehicle. The screw arms 45 carrying the keeper bars 36 will be swung through slots 37 so as to bring the keeper bars within the semi-circular seats 35. The several nuts 46 will then be screwed up to bring the unit tight against the underside of plate 21.

In similar manner when it is desired to remove the unit, the vehicle will be positioned as desired and the unit will be released to the receiving blocks or horses by unscrewing the nuts until it rests thereon.

Within the casing 20 a series of partitions divide the space so as to provide certain chambers for receiving the different instrumentalities by means of which the air conditioning system is carried out. A rectangular set of partitions 61, 62, 63, and 64, Fig. 3, extend from top to bottom of the chamber formed within casing 20 and enclose the air cooling chamber 65 connected with duct outlet 48 and blower chamber 66 connected with air duct 49, the two chambers 65 and 66 being separated by partition 70, Figs. 2 and 3, and the end wall 71 of evaporator heat exchanger 72 which is connected to partition 70 and supported at one end thereby and is supported at its other end by an angle iron 73 secured to wall 63. As clearly shown in Figs. 2 and 3, the evaporator heat exchanger comprises a multiplicity of interconnected pipe members 74 which normally receive refrigerant for evaporation through pipe 75 connected through a pipe 141, later to be described, with the refrigerant tank 76 and passes the expanded and evaporated gas from this evaporator through a pipe 77, a special valve construction 78 later to be described, and through pipe 79 to compressor 80. As clearly shown, heavy insulation indicated at 81 in Figs. 2 and 3 is placed about the walls 61, 62, 63, and 64 forming the combined chambers 65 and 66 and also under a bottom wall 82 of said chambers. A second set of partition walls 83, 84, 85, and 86 encloses the side insulation 81 and a second bottom wall 87 encloses the bottom insulation.

As shown in Fig. 2, the chamber 65 is connected with chamber 66 by a bottom chamber 88. A blower 89 of well known construction is in chamber 66 positioned adjacent the outside of the casing, as clearly shown in Fig. 3. The lower part of chamber 66 is separated from the upper part by the blower casing 90, supporting partition 91, and a transverse partition 92, see Fig. 15, so that the air travel will be from the inside of the truck compartment through duct 50, duct extension 48, chamber 65 past the cooling evaporator heat exchanger 72, through opening 88 and thence into the blower chamber and past the vanes thereof to be discharged through the upper part of chamber 66 through duct extension 49 and duct 51, to the interior of vehicle compartment.

Referring to Figs. 3 and 10, it will be noted that partitions 83, 84, and additional partition 93 between partitions 84 and the side wall 24, forms a main chamber 94 with an L-shaped extension chamber 95, which chambers are, as above pointed out, thoroughly insulated from the air cooling chambers 65 and 66. Within main chamber 94 is a gas engine 97 of common construction with its exhaust manifold 98 delivering outside of casing 20 at 99. A main motor shaft 100 has thereon a multiple grooved pulley 101. A multiplicity of belts 102 runs over multiple pulley 101 and a multiple pulley 103 on the shaft of compressor 80, which is of well known construction, and by which the compressor 80 is driven. The water circulation pipe 104 goes to radiator 105 located in a chamber 106 at the rear of the casing, Figs. 3 and 10. In a portion 107 of said chamber extended alongside of insulated air cooling chamber 65 is a gasoline storage tank 108 adapted to be filled from the outside, as indicated at 109 Fig. 1, through a pipe 110. A water filling cup 111, Fig. 1, is also provided for adding water to the cooling system at the top of the radiator through pipe 112, as indicated in Figs. 1 and 2. For convenience, as shown, the gasoline feed pipe 110 is carried through the insulation between partitions 63 and 85, Figs. 2 and 3. A water inlet pipe 113 carries the water through a pump in the engine casing, not shown, through the cooling passages of the motor and through pipe 104 back to the radiator.

The detailed arrangement of radiator 105 in relation to condenser coils 114 is shown in Figs. 2, 3, 10 and 11. As there shown, the condenser 114 faces an opening 115 in the front of the casing member 20, which opening may, if desired, be protected by a grating or grill. The radiator 105 extends along the side 23 of the casing 20 facing an opening 116 in said side as best shown in Fig. 3. Elongated top and bottom water chambers 117, 118 are formed by casing extensions 119, 120 shown in vertical cross section in Fig. 11 and in plan cross section in Fig. 3. The inlet pipe 104 from the motor enters the end of extension 119 as shown in Fig. 10 and the outlet pipe 113 going to the pump of the motor leaves the other extension 120.

The above set of instrumentalities, including a battery 121, that is, a gas tank 108, the radiator 105, the condenser 114, and the battery 121, are housed in a separate L-shaped compartment at the front of the casing 20 which is entirely segregated from the other two compartments within the casing, namely compartments 94, 95 for the gas engine and compressor and associated parts, and insulated air cooling compartment 65 and 66. Thus the engine and compressor compartment on the one hand and the radiator and condenser compartment on the other, are each available to be cleaned as desired independently of the air cooling compartment. A door 122 admits to one side of the engine compartment and a wide door 123, Fig. 3, admits to the other side of the engine compartment and to a blower 124 between the compressor compartment and the radiator and condenser compartment, which is driven from a pulley 160 on the motor shaft 100 and a belt 161 running over a pulley 162 on the shaft 163 of the blower rotor 124.

Figs. 3 and 10 show the position and means of operation of this blower wherein the blower casing 125 opens through the side 22 as indicated at 126 of Fig. 10. The blower draws air into its central opening 127 through radiator 105 and condenser coils 114 and discharges it outside of the casing through the opening 126. At the same time the casing 125 has a screened opening 128 into the compressor and motor chambers 94, 95, as indicated in Fig. 10, whereby air will pass through this chamber and about the instrumentalities there and out through a screened or otherwise controlled opening 129 at the rear of casing 20, as shown in Fig. 3, thus taking away the external heat of the compressor and motor. The blower 89, Fig. 16, is driven by a pulley 130 on an extension 131 of the motor shaft through a belt 132 running over a pulley 133 on the shaft 134 of the blower rotor 125. A generator starter 135 of distinctive construction is adapted to operate the motor 97 subject to control by thermostat and pressure means later to be described.

The compressor 80, of standard construction, is mounted on a stand 164 shown in detail in Fig. 13. In practice the refrigerant tank 76 is preferably cylindrical and fits between depressed portions 165 and 166 of the stand 164 which engage the tank with a degree of pressure to hold it firmly positioned without other means. As heretofore pointed out, the compressor is driven through multiple belts 102 over large multiple grooved pulley 103 on the compressor shaft 167, Fig. 10. The compressor 80 receives the returned gas in manifold 136 from pipe 79 and delivers the compressed fluid from manifold 137 through pipe 138. As already pointed out, the refrigerant fluid is delivered to the evaporator heat exchanger 72 through a pipe 75. This pipe leads through a double valve structure 139, 140, and a connecting pipe 141 from the fluid refrigerant tank 76. The details of this valve structure are shown in Fig. 17 and its purpose will be related to the reversal for defrosting later to be described. As shown in Fig. 17, valve 139 comprises an ordinary check valve and is in direct line 141 with a branch pipe 142 which connects with the pipe 75. Obviously when the pressure is direct from the tank 76 the check valve 139 will be closed by that pressure and prevent movement of fluid from pipe section 142. The valve 140 is in a branch pipe line 143. This valve embodies a spring pressed needle valve 147. When the pressure of the fluid coming through pipe 141 from tank 76 is sufficient to overcome the force of the spring 148 tending to hold valve 147 closed, a jet of fluid will pass the needle valve 147 and through pipe connection 75 to the evaporator coils 74 where its evaporation will take heat from the fins about said coils and from the air passing over them to provide the cooling desired.

This evaporation may, and frequently will, cause frosting on the coils and fins to such an extent as to restrict travel of air through the heat exchanger. When this happens the reduced air pressure in the chamber 88 below the heat exchanger 72 will operate the aneroid 150 causing an electrical contact at 151 which, through wire 152 will operate the reversing valve in a manner later to be described and cause the fluid to flow in the opposite direction, that is the hot fluid through heat exchanger 72 from compressor 80 and the cold fluid through condenser 114 back to the compressor. The details of this valve structure are shown in Figs. 4, 5, 6, 7, 8 and 9 and will now be given.

The valve chamber 78 comprises a vertical cylindrical member into which leads the pipe 138 from the compressor manifold 137 and the pipe 79 to the compressor manifold 136. Also connected with the valve casing 78 is pipe 168 running from the condenser to the valve casing and entering the valve casing 78 in a vertical plane directly above the entrance of pipe member 138 going to the compressed gas manifold. Referring to Figs. 4, 5, and 16, and particularly to Fig. 4, and assuming that the fluid is moving in the normal direction for entering the evaporator and effecting cooling heat exchange therewith, it will be noted that the hot compressed fluid from manifold 137 goes through pipe 138 into the valve chamber containing the valve block 170 from where it is caused to move through pipe 168 to condenser 114 where it is cooled. From the condenser 114 the fluid flows through pipe 169 and directly through sets of valves 171, 172, similar to valves 139, 140, wherein the check valve 172 is in position to permit free flow of the fluid through the pipe and into the compressed refrigerant tank 76. From the tank 76 the fluid, after it passes valve 140, goes through pipe 75 into the evaporator heat exchanger 72. From there it goes through pipe 77 into valve member 78 and from there through pipe 79 to the intake manifold 136 where it is again subjected to the action of the compressor.

The above operation is one in which the gas, after it enters the valve from feed pipe 138, takes the direction indicated by the dotted arrows of Fig. 4, first to the condenser, then to the tank, then to the evaporator and back through the valve and pipe 79 to the receiving manifold 136. When however, it is desired to reverse the flow for defrosting, the travel of the hot gas will be as indicated by the full line arrows of Fig. 4. That is, when the hot gas enters the valve casing with the parts as there shown in section, it passes, as indicated by the arrows, through pipe 77 to the evaporator heat exchanger 72, thence through pipes 75 and 141 to the tank 76, thence through pipe 169 to and through the condenser 114, thence through pipe 168 to valve 140 and from there through pipe 79 to receiving manifold 136.

The change of direction of flow while the motor and compressor are in constant operation, is effected by a cylindrical valve piece 175 which is adapted to be oscillated a quarter of a turn back and forth to bring about this result. Having reference to the drawings, Figs. 5, 7 and 8, 9, it will be noted that valve block 175 is cylindrical in outline, and is seated within a cylindrical cavity 176 in a valve block 177 which underlies the valve block 170. The rotary valve member 175 is fast on a vertical shaft 178, which is driven by means hereinafter to be described, and the opening through which the shaft extends to chamber 176 is sealed by a sealing washer 179 pressed upward by a spring 180 and connected in gas-tight relation with an accordion or corrugated drum 181. An annular chamber 182 is formed in the lower portion of rotary valve member 175, Figs. 5 and 7, and the hot fluid pipe 138 leading from the hot gas manifold enters this annular chamber 182, as clearly shown at 183, Fig. 5. Thus the hot gas comes to the valve chamber always in the same way as it necessarily would have to do, and is reversed in direction of flow from the valve by the change of position of the rotary valve member 175, always leaving the valve chamber through pipe 77 which conveys the fluid back to the receiving manifold 136.

This is accomplished by the following means: Referring to Figs. 5 and 7, the valve block 170 embodies a downwardly turned channel 185 presented to the face of rotary valve block 175 and connected with the pipe 168 which leads to the condenser. Also within the valve block 170 is a second channel 186 which opens against the rotary valve 175 and is connected with the return pipe 79 which leads to the inlet manifold 136. Likewise the block 170 contains a third channel 188 presented to the rotary valve member 175 and which is connected with the pipe 77 conveying the fluid from the evaporator heat exchanger to the valve or from the valve to the evaporator heat exchanger according to the position of the member 175. A fourth channel 190 formed in block 170 extends in an arcuate direction, as shown in Fig. 7, from channel 185 to a downwardly opening channel 187 which fronts the top of rotary valve 175 and connects with channel 190 in the manner shown in Fig. 7 in full lines and in Fig. 8 in dotted lines.

The rotary valve 175 is provided with an opening 192 all the way through, as shown in Figs. 5 and 9, which therefore at all times is open to the annular passageway 182 about the bottom portion of rotary valve member 175. The opening 192 is preferably arcuately oblong in cross section in order to avoid complete blocking of compression in the shifting of the valves which might cause jamming or chattering. The cross sectional form of the opening 192 is shown in Fig. 9. Also there shown as related to the longitudinal opening 192 is an arcuate channel 193 which is shown in plan in Fig. 9 and in cross section in Fig. 8, as there related to the channel 188, also shown in dotted lines in Fig. 5.

As the parts are shown in Fig. 5, which is the normal position for refrigerating, it will be noted that the hot compressor gas comes into the channel 182 from pipe 138. From the annular channel 182 it passes through opening 192 into pipe 168 from where it goes through the condenser 114, from the condenser through pipe 169 to the tank 76, from the tank 76 through pipes 141 and 75 to the evaporator heat exchanger and from the evaporator heat exchanger through pipe 77, see Figs. 5 and 8, into the valve block 170, through channel 188 to the arcuate channel 193 from which it travels through channel 186 to pipe 79 and from there back to the inlet manifold of the compressor. This also is fully illustrated in Fig. 7. When however, the valve member 175 is turned a quarter of a turn to the left, the vertical channel 192 will come under the opening 186 leading to the pipe 77. At the same time the depressed channel 193 in valve 175 will move to extend between openings 186 leading to pipe 79 and 187 connected with arcuate channel member 190. When the parts are in this position the hot gas coming through pipe 138 from manifold 137 will pass from annular passageway 182 up through vertical passageway 192, passageway 188 and through pipe 77 directly to the evaporator heat exchanger where its heat will quickly cause defrosting of the refrigerant coils there. From the evaporator heat exchanger, as shown by the full line arrows of Fig. 4, the fluid will pass through pipes 75 and 141 to the tank 76, through pipe 169 to the condenser and through pipe 168 back to the valve. At the valve it will flow through arcuate channel 190 and vertical channel 187 in block 170 into arcuate channel 193 in valve member 175 and from there through passageway 186 to pipe 79 leading to the receiving manifold of the compressor.

From the above description it will be apparent that in the dual operation, for normal refrigerating and for defrosting, the refrigerant tank in effect occupies a position between the evaporator and the condenser. The check valve 139 during refrigerating operation prevents free flow from the tank to the compressor so that the gas has to be forced through the valve 140 thus determining the delivery pressure to the evaporator. In the reverse or defrosting flow, valve 139 permits free flow to the tank. A second check valve 172 and second pressure valve 171, similar to the valve 139, 140, is placed in the pipe line 169 between the condenser 114 and the refrigerant tank 76. In normal or refrigeration operation the check valve 172 permits free flow of refrigerant from condenser 114 to the refrigerant tank 76. But when the valve 78 has been operated to reverse the flow for defrosting, the check valve 172 blocks free flow from the tank to the condenser and the liquid will have to flow through the pressure valve 171 thus determining the pressure at which the refrigerant goes to condenser 114.

Each of the valves 141 and 171 has the pressure delivery past it determined by the needle valve 147 actuated by the manually controlled spring 148, so that the pressure deliveries may be made uniform for each direction of flow of the refrigerant. It will thus be apparent that the system is balanced in operation for both normal flow of refrigerant from the tank to the evaporator in refrigerating operation and for reverse flow from the tank to the condenser in the defrosting operation.

In the latter, the condenser becomes an evaporator and is intensely cold so that the air drawn through it will temporarily chill the first chamber 107 and then compressor and motor chambers 94, 95, by reason of air passing through grating 128 of blower casing 125, see Fig. 3.

The block 170 is carried by a bracket arm or plate 194, Fig. 8, to which the block is secured by a series of bolts 195, Figs. 7 and 8, as clearly shown in Fig. 8. The bolts 195 go through the block 170 into the second block 177 securing the whole assemblage together to the supporting bracket 194. This bracket 194 has a vertical lip 204 secured by strong bolts 205 to a wall 83 of the tank, see Figs. 2 and 3. A bottom bracket plate 196 having the plan outlined, clearly shown in Figs. 6 and 7, is secured to block 177 by screw bolts 197. To the bracket plate 196 is secured a frame piece 198 by means of bolt 199, and by a surrounding strap 200 an electric motor 201 is supported from plate 196. Projecting from motor 201 is a gear box 202 into which extends the vertical shaft 178 connected with the rotary valve member 175. Through reducing gearing within gear box 202 (not shown) the motor 201 slowly rotates the shaft 178 to give the same one quarter turn in one or the other of the directions to cause the passages and ports to register, as in Fig. 5, or in its other position. Upon shaft 178 is mounted a contact arm 206, shown in Fig. 6, which is adapted to oscillate between contact points 207 and 208. Contact point 207 is carried by a bracket 209 fast on plate 196 and contact point 208 is carried by a bracket 210 fast on plate 196. Contact point 207 operates means to open and close the circuit between wires 211 and 212, and contact point 208 operates means to open and close the circuit between wires 213 and 214. The motor 201 is a standard reversing motor with two sets of current wires 215, 216 and 217, 218. As already pointed out, the aneroid 150 is caused to expand when frosting so blocks the air passage that substantial negative pressure is set up in the chamber 65 below evaporator heat exchanger 72. This closes electric circuits in a manner later to be pointed out, and causes energization of the motor 201 in the direction to carry the arm 206 from whichever one of contact points 207 or 208 it may then be engaging to the other of said contact points.

The defrosting of the evaporator heat exchanger 72 will necessarily result in a release of a considerable quantity of water. We employ this for re-evaporation in conjunction with other means for providing water vapor so that suitable humidification of the truck compartment may be effected at all times. As shown in Figs. 2 and 13, a pan 219 is provided which overlies the entire floor 82 of the combined insulated chamber 65, 66. A waste trap 220 is adapted to release surplus water at a predetermined depth, as clearly indicated in Fig. 2. The pan will be filled with a layer of fibrous substance preferably mineral wool, which extends above the surface of the pan as indicated at 221. If desired the pan may be omitted and the bottom of chamber 88 be used as a pan. In either case the height of water retained will be determined by the height of the waste trap tube 220. As clearly shown in Fig. 16, the pipe 141 from the refrigerant tank is carried in coils 141a along the bottom of pan 219, which results in additionally cooling the refrigerant on the way to the evaporator through pipe 75, which is desirable, and at the same time sufficiently warming the water in pan 219 to prevent any possibility of freezing and to increase its capacity for evaporation. In addition to receiving the water which runs down from the defrosting action, the pan 219 will receive water from a pipe 222 Fig. 13, which is connected with a filling cap 223 extending through side wall 23. By this means the pan 219 will be filled with water before the refrigerating mechanism is started and excess water will drain off through trap drain 220.

For furnishing additional quick moisture an electric heating element 224 of standard immersion construction is positioned in the pan 219, as indicated in Fig. 13, at a point closely adjacent the opening 225 into the blower 125. Electrical connections 226 go from the heating element 224 to a humidostat 227 of standard construction located in the vehicle compartment as indicated in Fig. 2 and connected in the electrical wiring system by wiring cable 228. By this means the heater 224 will only operate when there is a call for humidification within the vehicle compartment and will be put out of operation when the air in the vehicle compartment at any temperature is sufficiently humidified.

In practice, the pan 219 will be filled with water before the cooling apparatus is set in operation. When this is effected, through control box 229 current will immediately be supplied to the heater 224. This heater is positioned near the top of the surface of the water with very little water surrounding it and will immediately give off a quantity of water vapor which is carried up into the truck compartment before any substantial frosting can take place. In this manner the air in the truck compartment will be rendered humid. As frosting takes place on the evaporator heat exchanger more moisture goes to the compartment both by reason of the action of the heater 224 and because of evaporation into the current of air from the fibrous material 221 of water warmed by pipe coils 141a. The result is that as fast as moisture may be taken from the air by frosting it is restored to the air within the truck in the manner described. If at any time the air within the truck reaches a high degree of humidity, approaching substantial saturation, the humidostat 227 will break the circuit to the heater 224 and only such moisture as comes from evaporation on the fibrous material 221 will then go to the compartment. By this means the compartment of the truck will have its air maintained in a substantially saturated condition of humidity and there will be no tendency to withdraw moisture from any of the load contents of the truck compartment.

Considering the wiring diagram Fig. 18, the thermostat 56 may comprise an expansion member 232 with a movable contact 233 connected with wire 234 and adapted to engage a fixed contact 235 connected with a wire 236. The contacts 233 and 235 will be normally in engagement and are only separated when the temperature within the truck compartment reaches the desired low degree, when the contraction of member 232 will cause separation thereof, and stop operation of gas engine and compressor.

Several safety devices are employed. Wire 234 goes to a contact member 237 carried by a thermostat arm 238 in a box 239. The contact member 237 is normally in contact with a contact member 240 which is connected with a wire 241. If for any reason the engine heats unduly, thermostatic member 238 will move to break the contact between members 237 and 240 and the motor 97 will thereby be stopped. Wire 241 goes to a movable contact member 242 which engages a contact 243 connected with a wire 244. The movable contact piece 242 is pivoted at 245 and is held in contact with member 243 by a spring 246. A pressure tube 247 runs from the hot fluid manifold 137 of compressor 80 to a pressure responsive device 248 having a plunger 249 adapted to engage an arm 250 fast with the movable contact arm 242. When the pressure in the compressor system rises to approach the danger point the plunger 249 will engage the arm 250 and break contact between contact members 242 and 243 thus stopping the gas motor and the compressor. A gauge 250 in the instrument control box 229 is connected by a branch pipe 251 with the pipe 247 and indicates to the operator the pressure at which the compressor is working. A low pressure tube 252 leads from the low pressure manifold 136 of compressor 80 to a pressure responsive device 253 which embodies a plunger 254. An arm 255 is caused to engage the end of plunger 254 by means of a spring 256. There is an arm 257 movable with arm 255 about a point of pivoting 258, and when the pressure within the system drops to indicate blocking from freezing, the spring 256 will be permitted to rock arms 255 and 257 so as to bring arm 257 against arm 250 and also break the contact between members 242 and 243. A gauge 259 on a branch pipe 260 connected with pipe 252 indicates to the operator the reduced pressure at which the system is working. The wire 244 is connected through branch wire 261 with a high tension coil 262 which is connected through cable 263 with the distributor in the usual way, and wire 244 is also connected with the windings of a relay 264 for a purpose hereinafter to be described. The second wire 236 running from the thermostat contacts 233, 235, goes to a contact 265 which normally engages a contact 266 on a spring-held double contact arm 267 secured to frame piece 268 and connected to a wire 269. The wire 269 passes through a resistance winding 270 which engages a thermostat piece 271. A hook 272 on thermostat piece 271 engages the hook 273 connected with double arm 267. This resistance winding 270 is in a branch circuit including a wire 275 which runs to a contact member 276 adapted to engage another contact member 277 connected by a wire 278 with a relay 295 and from the relay 295 with ground 296. The purpose of this arrangement will be later described, but the object of the thermostatic member 271 and heating resistance 270 is to operate to throw the system out of operation when current continues for too long a period to pass through the circuit including the wires 275, 278 and relay 295.

With all of these instrumentalities normally closed and the thermostat contacts 233, 235 closed calling for heat exchange operation, a branch wire 279 from the main battery wire 280 will carry battery current through wire 279, bridge piece 267, past contacts 265, 266 through wire 236, past contacts 235, 233, through wire 234, past contacts 237, 240, through wire 241, past contacts 242, 243, through wire 244 to relay 264 and finally to ground 281, thus energizing relay 264 and closing contacts 282. This causes heavy battery current to pass through wire 284 to and through relay 285 and thence through wire 286, through the field coil 287 of the starter motor armature 288 and to ground 289. At the same time current will pass through a rheostat 290 and wire 291 through generator field coils 292 and thence through wire 293, to the armature 288, thereby caused to generate current going through battery 121.

The relay 285 has only a few windings which will be sufficient when the heavy battery current from wires 280, 284 passes through it to operate armature 294 and thereby send current through closed contacts 276, 277 and wire 278 through relay 295 to the ground 296, which through lever system 297 will operate the choke valve 298. As soon as the motor 288, however, has started, generator current will move back over wire 286 through relay 285, wire 284, contact 282 and main battery wire 280 to the battery. This current will be much weaker than the strong battery current and will result in releasing armature 294 and breaking contact 276, 277, with the result that the choke valve 298 is released to normal position, and resistance winding 270 is put out of circuit entirely. At the same time current is passed from wire 244 through wire 261 and high tension coil 262 to ground 299. As shown in the upper portion of Fig. 18, the lever system 297 includes a bimetallic thermostatic arm 330 which has a pin 331 operating in a slot 332 in a link 333 forming part of said lever system. With this means, when the engine is hot the thermostatic action of arm 330 will move pin 331 down slot 332 so that relay 295 will not have any effect on choke valve 298.

The electrical hook-up for operating the rotary valve 175 to cause reversal of flow of refrigerant for defrosting is shown in the lower right hand portion of the wiring diagram of Fig. 18. When the air passages about the evaporator heat exchanger 72 become so clogged with frost as to block or partially block flow of air therethrough, the reduction in pressure within passageway 88 in the lower part of chamber 65 will cause the aneroid 150 to expand bringing the contact member 151 in engagement with a contact piece 300 connected with a ground 301. This permits battery current to flow through a branch wire 302 through a relay 303 and a wire 304 from said relay to the ground 301. Operation of the relay armature 305 will close contacts 306, 307 and 308, and open contacts 309, 310 and 311.

The motor 201 may be considered as formed of its two parts, the field coil 312 and the armature 313; the wires 215 and 216 connect with the field coil 312, and the wires 217 and 218 connect with the armature 313, wire 218 going to ground 314.

In order to reverse the operation of motor 201 it is necessary to reverse the direction of current through the field windings 312, and this is effected by the shifting of contacts 306 to 311 inclusive.

All the parts as shown in the lower right hand portion of Fig. 18 are as they would be for normal refrigerating action, that is, with contact members 151 and 300 out of contact and relay armature 305 inactive and contacts 309, 310 and 311 closed. Also the arm 206 has operated at the end of its half-turn to break contact between wires 213 and 214 at the point 315. When however, the defrosting action is called for because of contact between members 151 and 300 and relay 303 has broken contacts 309, 310 and 311 and made contacts 306, 307 and 308, battery current will pass through wire 316 and wire 212 across the closed contact 317 through wire 318 across contact 308 to wire 217 and thence to motor armature 313 to ground 314. At the same time current will go from wire 217 through wire 319 across closed contact 306, through wire 320 and wire 216 in the direction of the arrow marked a, to and through the field coil 312 to wire 215, through closed contact 307 and through wire 321 to ground 322. This will operate the motor 201 to cause arm 206 to travel from plunger 208 to plunger 207 which will break the circuit at 317 terminating operating of the motor. At the same time the rotary valve 175 will have been moved from its position for passing the refrigerant normally for refrigerating action to its position for reversing the flow of refrigerant to effect defrosting.

As soon as the defrosting operation has reopened the air passages through evaporator heat exchanger 72, which will occur very quickly, the air pressure in passageway 88 will increase with the result that the aneroid 150 will contract, breaking the contact between arm 151 and contact piece 300. This will de-energize relay 303 whereupon the armature 305 will take its inoperative position and contacts 309, 310 and 311 will be re-established. This will permit battery current to pass through wire 316 and wire 214 across the closed circuit at 315 to wire 213, across closed circuit 311 to wire 217 and thence through motor armature 313 to wire 218 to ground 314. At the same time current will pass through wire 319, closed contact 309 and wire 215 to the field coil 312 and thence through wire 216, moving in the direction indicated by the arrow marked b, through wire 323 through closed contact 310 and wire 321 to ground 322. The direction of current through field coil 312 is thus reversed which operates the motor 201 in the opposite direction, with the result that arm 206 travels back to the position indicated, breaking the circuit 315 and thereby terminating operation of the motor. At the same time the valve 175 will have been restored to normal position passing refrigerant through the evaporator heat exchanger 72 to effect cooling of the air passing through said evaporator heat exchanger.

As shown at the central left of the diagram of Fig. 18, a wire 324 leads from the wire 236 to the water vaporizing heater 224. From the heater 224 the wire 226 leads to the humidostat 227. The humidostat, of well known construction, is provided with contacts 325, 326. Contact 325 is connected with the wire 228 and contact 326 with a ground 327. The humidostat 227 has the contact 326 carried by a member formed of material such that it readily absorbs moisture, and from the absorption of moisture will be caused to move away finally breaking contacts 325 and 326 and putting the heater 218 out of operation. The humidostat will be so adjusted that the breaking of contact will only occur when substantial moisture saturation of the air within the vehicle compartment has taken place. The main switch 328 operated from the control box 229 is adapted to turn on and off electrical connections for controlling operation of the entire system.

The advantages of my invention will sufficiently appear from the foregoing description. A primary advantage is that a compact, efficient and not too heavy assemblage of instrumentalities is provided, which is adapted readily to be attached to and removed from the outside of a transport vehicle such as a truck or railroad car, and which, when attached, cooperates with means within the vehicle compartment for causing a circulation of properly conditioned air to, through and from, the compartment. The primary conditioning effected is for cooling the air within the vehicle compartment, with means for rendering such cooling continuous and within proper temperature limits, and at the same time for providing addition of moisture to the air within the vehicle compartment sufficient to offset any withdrawal of moisture by frosting, whereby water will not be drawn from the contents of the vehicle compartment. Further highly important advantages are found in the arrangement of the units in the assemblage, the provision of efficient and certain means for stopping and starting the gas engine, for controlling the flow of refrigerant to act as a cooling agent and as a defrosting agent, for adding moisture to the interior of the vehicle, and for making practically effective the operation of an air conditioning unit adapted to be removably attached to a transport vehicle.

We claim:

1. Means for air-conditioning compartments adapted to hold moisture-containing perishables, comprising means for circulating air in such compartment, means for cooling said air including an evaporator heat exchanger and a compressor, means controlled by the pressure of said current of air for causing reversal of the flow of refrigerant to defrost the evaporator heat exchanger, and means for causing addition of moisture to the said current of air proportional to the amount of moisture withdrawn therefrom by frosting.

2. In means for removably securing an air-conditioning unit to the outside of a compartment of transport vehicles such as trucks in cooperative relation with air ducts within the compartment adapted to permit withdrawal of air from one portion of the compartment and delivery of air into another portion of the compartment, comprising a plate adapted to be attached to a wall of the vehicle having duct extensions passing through openings in said wall and forming continuations of said first-named air ducts, said plate formed with surrounding depending flange members forming an inverted box, a rectangular open-topped box having its upper portions adapted to fit within the inverted box formed on the plate and housing an assemblage of air-conditioning instrumentalities for cooperating with said ducts, and means for removably securing said last-named box to the plate and inverted box with the edges of the last-named box engaging the plate within the inverted box.

3. Means for air-conditioning compartments adapted to hold moisture-containing perishables, comprising a housing adapted to be removably attached to the compartment, a plurality of compartments in said housing one of which is insulated from the other compartments, means in said insulated compartments for drawing air from the vehicle compartment, cooling it and returning it to the vehicle compartment, including an evaporator heat exchanger, means in the other compartments including a gas engine and compressor for causing refrigerant fluid to move to and through the evaporator, and means in the insulated compartment subject to the air pressure therein for causing reversal of flow of the refrigerant through the evaporator heat exchanger to defrost the same.

4. Means for air-conditioning compartments adapted to hold moisture-containing perishables, comprising a housing including an insulated compartment, a blower and evaporator heat exchanger in said insulated compartment, means for defrosting the heat exchanger, a pan in the bottom of the insulated compartment for receiving the water released by defrosting, other means for delivering water to the pan, and an electric heater in the water adjacent the air intake of the fan for releasing water vapor to the air while the fan is in operation.

5. Means for air-conditioning compartments adapted to hold moisture-containing perishables, comprising a housing including an insulated compartment, a blower and evaporator heat exchanger in said insulated compartment, means for defrosting the heat exchanger, a pan in the bottom of the insulated compartment for receiving the water released by defrosting, other means for delivering water to the pan, an electric heater in the water adjacent the air intake of the fan for releasing water vapor to the air while the fan is in operation, and a humidostat in the compartment for controlling operation of the electric heater.

6. Means for air-conditioning compartments adapted to hold moisture-containing perishables, comprising a housing including an insulated compartment, a blower and evaporator heat exchanger in said insulated compartment, means for defrosting the heat exchanger, a pan in the bottom of the insulated compartment for receiving the water released by defrosting, other means for delivering water to the pan, and a body of fibrous material such as mineral wool in the pan and extending above the surface thereof for holding the water within the pan and for presenting extensive evaporating surface to the current of air moved by the blower.

7. Means for air-conditioning compartments adapted to hold moisture-containing perishables, comprising means for circulating air in such compartments, means for cooling said air including a compressor and an evaporator heat exchanger having restricted passageways about said heat exchanger through which the circulated air must pass, and a pressure responsive member subject to decreased static pressure of the circulated air caused by icing of said constricted passageways for causing reversal of flow of refrigerant through the evaporator, whereby when such icing and decreased pressure occur defrosting of the heat exchanger will be effected.

8. Means for air-conditioning compartments adapted to hold moisture-containing perishables, comprising means for circulating air in such compartments, means for cooling said air including a compressor and an evaporator heat exchanger having restricted passageways about said heat exchanger through which the circulated air must pass, valve mechanism adapted to be shifted to cause reversal of flow of refrigerant to defrost the evaporator heat exchanger, and a pressure responsive member subject to decreased static pressure of the circulated air caused by icing of the passageways for causing shifting of said valves, whereby when such icing and decreased pressure occur defrosting will be effected.

9. Means for air-conditioning compartments adapted to hold moisture containing perishables, comprising instrumentalities for cooling the air within the vehicle compartment including a chamber having therein an evaporator heat exchanger and a second chamber having therein a blower for drawing air through the heat exchanger, means for delivering compressed refrigerant to the evaporator heat exchanger including a valve through which the refrigerant liquid is caused to flow, means including a compressor for effecting said flow, said valve comprising a movable member having ports and channels cooperating with said last named means for controlling movement of the refrigerant liquid, means for moving the valve to reverse the flow of refrigerant fluid therethrough, and means subject to the static air pressure within the second chamber resulting from operation of the blower for rendering the valve moving means operative.

10. Means for air conditioning the storage compartment of a transportation truck, comprising a single unitary casing adapted to be removably mounted as an entirety upon and supported by a wall of the compartment, an insulated chamber formed in said casing, an evaporator in said chamber, a driven blower in the chamber for blowing air through the evaporator, means for placing said compartment in communication with said blower, a driven compressor, a condenser, driven air moving means for the condenser and a gas engine mounted in said casing all outside said insulated chamber, connections to said gas engine whereby it provides a single source of power to operate all said driven instrumentalities, means for causing reversal of flow of the refrigerant through the evaporator and condenser respectively to effect heating and defrosting of the evaporator, and means controlled by the temperature in the compartment for stopping and starting the gas engine.

JOSEPH A. NUMERO.
FREDERICK M. JONES.